US012212917B2

(12) United States Patent
Holley et al.

(10) Patent No.: US 12,212,917 B2
(45) Date of Patent: *Jan. 28, 2025

(54) EARPHONE POSITIONING AND RETENTION

(71) Applicant: Sonos, Inc., Santa Barbara, CA (US)

(72) Inventors: Brandon Holley, Brookline, MA (US); Wei-Hean Liew, Boston, MA (US); Jerad Lewis, Cambridge, MA (US); David Amaranto, Truckee, CA (US); Alexia Delhoume, Boston, MA (US); Casper Asmussen, Malmö (SE); Victor Johansson, Malmö (SE)

(73) Assignee: SONOS, INC., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,418

(22) Filed: May 10, 2023

(65) Prior Publication Data

US 2023/0283942 A1 Sep. 7, 2023

Related U.S. Application Data

(63) Continuation of application No. 17/480,008, filed on Sep. 20, 2021, now Pat. No. 11,700,476.

(Continued)

(51) Int. Cl.
*H04R 1/10* (2006.01)

(52) U.S. Cl.
CPC ......... *H04R 1/1066* (2013.01); *H04R 1/1016* (2013.01); *H04R 1/1041* (2013.01); *H04R 1/1091* (2013.01)

(58) Field of Classification Search
CPC ........ H04R 1/10; H04R 1/1016; H04R 1/105; H04R 1/1066; H04R 25/02; H04R 25/607;

(Continued)

(56) References Cited

U.S. PATENT DOCUMENTS 1,733,579 A * 10/1929 Coolbroth ............ H04R 25/652 381/328
214,019 A 5/1969 Newman et al.
(Continued)

FOREIGN PATENT DOCUMENTS

CN 305577886 1/2020
CN 306686819 7/2021
(Continued)

OTHER PUBLICATIONS

International Search Report and Written Opinion for International Application No. PCT/US2021/051140, Search completed Dec. 14, 2021, Mailed Dec. 23, 2021, 12 Pgs.

(Continued)

*Primary Examiner* — Ryan Robinson
(74) *Attorney, Agent, or Firm* — Workman Nydegger

(57) ABSTRACT

Earphone positioning and retention mechanisms are disclosed. One earphone described includes a speaker driver, a flexible eartip comprising a first oval shaped contact surface at an opening forming a hole through the eartip, the first oval shaped contact surface configured to contact an outer surface of a user's ear canal when worn, a body portion comprising a second contact surface configured to position behind an anti-tragus portion of the user's ear, and, a retaining member formed of a compliant material, comprising a third contact surface configured to conform to a cymba conch portion of the user's ear, where the body portion and the retaining member are shaped in a way that the second contact surface contacts the anti-tragus portion and the third contact surface contacts the cymba conch portion at the same time, when the first contact surface is already in contact with the outer surface of the ear canal.

14 Claims, 14 Drawing Sheets

Related U.S. Application Data

(60) Provisional application No. 63/080,611, filed on Sep. 18, 2020.

(58) Field of Classification Search
CPC ............ H04R 25/652; H04R 2201/109; H04R 2225/025; H04R 2460/17
See application file for complete search history.

(56) References Cited

U.S. PATENT DOCUMENTS

| | | | | |
|---|---|---|---|---|
| 239,160 | A | 3/1976 | Giberstein | |
| 4,965,838 | A * | 10/1990 | Kamon | H04R 1/1016 381/322 |
| D355,727 | S | 2/1995 | Gentile et al. | |
| D422,899 | S | 4/2000 | Kudo | |
| 6,688,421 | B2 * | 2/2004 | Dyer | H04R 25/652 381/328 |
| D505,865 | S | 6/2005 | Seizer et al. | |
| D510,461 | S | 10/2005 | Vu | |
| D547,189 | S | 7/2007 | Legros | |
| 8,234,395 | B2 | 7/2012 | Millington | |
| 8,249,287 | B2 * | 8/2012 | Silvestri | H04R 1/1058 381/370 |
| D716,499 | S | 10/2014 | Li | |
| 9,036,853 | B2 | 5/2015 | Silvestri et al. | |
| 9,398,365 | B2 * | 7/2016 | Liu | H01R 13/5202 |
| D775,960 | S | 1/2017 | Erdwiens | |
| D806,858 | S | 1/2018 | Lu | |
| 10,057,675 | B2 * | 8/2018 | Mankodi | A61B 5/6817 |
| 10,104,463 | B2 * | 10/2018 | Kim | H04R 1/1016 |
| 10,291,980 | B2 * | 5/2019 | Silvestri | H04R 1/2849 |
| D871,376 | S | 12/2019 | Zhou | |
| D872,064 | S | 1/2020 | Cai | |
| D883,257 | S | 5/2020 | Duddy | |
| D883,262 | S | 5/2020 | Wu | |
| 10,667,030 | B2 * | 5/2020 | Wexler | H04R 1/1083 |
| D894,158 | S | 8/2020 | Gu | |
| D896,205 | S | 9/2020 | Zhang et al. | |
| D902,182 | S | 11/2020 | Wang | |
| 10,827,290 | B2 * | 11/2020 | Valenzuela | H04R 1/1016 |
| D903,638 | S | 12/2020 | Li | |
| D904,349 | S | 12/2020 | Saxton et al. | |
| D912,016 | S | 3/2021 | Ando et al. | |
| D918,181 | S | 5/2021 | Bailey et al. | |
| D920,288 | S | 5/2021 | Vautour | |
| D923,610 | S | 6/2021 | Bonahoom et al. | |
| D924,848 | S | 7/2021 | Yang | |
| D927,466 | S | 8/2021 | Zhang et al. | |
| D928,619 | S | 8/2021 | Kim | |
| D930,617 | S | 9/2021 | Tanaka | |
| D930,618 | S | 9/2021 | Lindenberger | |
| D930,620 | S | 9/2021 | Lindenberger | |
| 11,159,875 | B2 * | 10/2021 | Kosaka | H04R 1/105 |
| D941,275 | S | 1/2022 | Liu et al. | |
| 2006/0067556 | A1 * | 3/2006 | Bailey | H04R 1/105 381/328 |
| 2009/0119884 | A1 * | 5/2009 | Kitazawa | H04R 1/105 24/3.1 |
| 2015/0092977 | A1 | 4/2015 | Silvestri et al. | |
| 2018/0131798 | A1 * | 5/2018 | Hviid | H04R 1/10 |
| 2020/0077173 | A1 | 3/2020 | Wexler et al. | |

FOREIGN PATENT DOCUMENTS

| | | | |
|---|---|---|---|
| CN | 306686834 | | 7/2021 |
| CN | 306794551 | | 8/2021 |
| CN | 216565540 | U | 5/2022 |
| JP | 1660257 | S | 5/2020 |
| KR | 301054293.0000 | | 4/2020 |
| KR | 301059977.0000 | | 5/2020 |
| WO | 2006104981 | A2 | 10/2006 |
| WO | WO-2018165716 | A1 * | 9/2018 |

OTHER PUBLICATIONS

"1More ColorBuds True Wireless Earbuds, Premium Bluetooth Earphones IPX5 Water Resistant, 22 Hours Playtime with Fast Charge and ENC Microphones, Auto Play/Pause, for Workout, Sports, Home Office", Amazon, Jun. 24, 2020, retrieved from https://www.amazon.com/1MORE-ColorBuds-Bluetooth-Earphones-Microphones/dp/B08BRNQV3X/ on Feb. 17, 2021, 14 pgs.

"1More Stylish True Wireless Earbuds, Bluetooth 5.0, 24-Hour Playtime, Stereo In-Ear Headphones with Charging Case, Built-in Microphone, Alternate Pairing Mode", Amazon, Apr. 3, 2019, retrieved from https://www.amazon.com/1MORE-Stylish-Wireless-Earbuds-Built/dp/B07M6LP3F9 on Feb. 17, 2021, 14 pgs.

"Anker Life", first available Sep. 30, 2020 [online], [retrieved Apr. 8, 2022]. Available from the Internet, URL:<https://www.amazon.com/dp/B08KDZ2NZX/ref=cnn_sw_em_r_mt_dp_VCQ660A5CWDWM4Y5JT30 ?_encoding=UTF8&psc=1>, 8 pgs.

"Forbes Huawei FreeBuds 3", announced Sep. 9, 2019 [online], [site visited Mar. 16, 2023]. Available from internet, URL: <https://www.forbes.com/sites/davidphel an/2019/09/09/move-over -airpods-2-h uawei-reveals-show-stopping-freebuds-3-with-cool-featu res/?sh=5c9b83451538>.

"Geekria Silicone Case Cover", announced Nov. 14, 2019 [online], [site visited Mar. 17, 2023]. Available from internet, URL:<https://www.amazon.com/Silicone-FreeBuds-Charging-ProtectiveFreeBuds3/dp/B081 H6W64>.

"Getting the proper fit (video included)", Bose, Apr. 10, 2013, retrieved from https://www.boselatam.com/en_ar/support/article/getting-the-proper-fit-video-included-mie2.html on Feb. 21, 2021, 3 pgs.

"Huawei FreeBuds 3", announced Dec. 13, 2019 [online], [site visited Mar. 17, 2023]. Available from internet, URL: <https://www.amazon.com/H UAWEI-FreeBuds-Intelligent Cancellation-Connection/dp/B07YXZT12X/>.

"Huawei Freebuds 3 Review", Announced Nov. 7, 2019 [online], [site visited Mar. 17, 2023]. Available from internet, URL:<https://www.youtube.com/watch?v=Irs4KNYcpZk>.

"Jamaudio Full Wireless Earphone Gray Live-Free-GY [Remote Controller, Microphone Compatible/ Wireless (Left and Right Separation)/ Bluetooth]", Publication Date—Jan. 9, 2020, Publication Material # HJ31056525, 9 pgs.

"NUARL NT110 Waterproof True Wireless Stereo Earphone (White)", Publication date: Oct. 10, 2019, Publication Material # HJ31037888, 8 pgs.

"Skullcandy Grind", first available Jan. 15, 2022 [online], [retrieved Apr. 8, 2022]. Available from the Internet, URL:<https://www.amazon.com/dp/B08X1R3K8N/ref=cnn_sw_em_r_mt_dp_1ZW53HH0ZGCMVED68TC7?_encoding=UTF8&psc=1>, 4 pgs.

"Skullcandy Sesh", first available Aug. 2, 2019 [online], [retrieved Apr. 8, 2022]. Available from the Internet, URL:<https://www.amazon.com/dp/B07VPX4W35/ref=cnn_sw_em_r_mt_dp_22SBFHTEM7K7F544Z6Z7?_encoding=UTF8&psc=1>, 5 pgs.

"Soundcore", first available Aug. 12, 2021 [online], [retrieved Apr. 8, 2022]. Available from the Internet, URL:<https://www.amazon.com/dp/B09CGMDJTZ/ref=cnn_sw_em_r_mt_dp_C6S4J4D1XNTEZRJ31KJK>, 7 pgs.

"T21 TWS Wireless Bluetooth Earphone", announced May 8, 2019 [online], [site visited Mar. 17, 2023]. Available from internet, URL:<https://www.amazon.in/T21-Wireless-Bluetooth-Earphone-Reduction/dp/B07 RPY2DP6>.

"U-ROK Wireless Earbuds Bluetooth 5.0 with 800mAh Charging Case, Automatic Power on/off Sports Earphones in-Ear IPX5 Waterproof HD Stereo Sweatproof Headphones with Built-in Mic for Gym and Running", Amazon, Mar. 26, 2019, retrieved from https://www.amazon.com/U-ROK-Bluetooth-Waterproof-Sweatproof-Headphones/dp/B07NRNGQBP on Feb. 21, 2021, 12 pgs.

Carnoy, "Bose SoundSport In-Ear Headphones review: A sweat-resistant, earbud-style headphone that's ultracomfortable and stays in your ears", cnet, Oct. 26, 2015, retrieved from https://www.cnet.com/reviews/bose-soundsport-in-ear-headphones-review/ on Feb. 17, 2021, 6 pgs.

(56) References Cited

OTHER PUBLICATIONS

Davies, "Huawei's FreeBuds 3 look like AirPods, but don't let that fool you", Slash Gear, Sep. 6, 2019, retrieved from https://www.slashgear.com/huaweis-freebuds-3-look-like-airpods-but-dont-let-that-fool-you-06590374/ on Apr. 15, 2020, 8 pgs.
Etherington, Darrell, "Jaybird's Run totally wireless earbuds are wire-free wonders for everyone", TechCrunch, Oct. 20, 2017, Retrieved from: https://techcrunch.com/2017/10/20/jaybirds-run-totally-wireless-earbuds-are-wire-free-wonders-for-everyone/, 3 pgs.
Horsey, "AirLoop convertible wired and wireless earbuds", Geeky Gadgets, Apr. 1, 2019, retrieved from https://www.geeky-gadgets.com/airloop-wireless-earbuds-01-04-2019/ on Feb. 17, 2021, 10 pgs.
Joire, "Huawei's FreeBuds 3 are a solid alternative to Apple's AirPods Pro", Android Police, Feb. 10, 2020, retrieved from https://www.androidpolice.com/2020/02/10/huawei-freebuds-3-a-solid-alternative-to-apples-airpods-pro/ on Feb. 17, 2021, 10 pgs.
Minasians, Christopher "Sennheiser Momentum True Wireless review: The best-sounding wireless earbuds", Expert Reviews Holdings Ltd, Feb. 21, 2019, Retrieved from: https://www.expertreviews.co.uk/sennheiser/1408642/sennheiser-momentum-true-wireless-review-best-sounding-earbuds, 7 pgs.
Petrovan, "Huawei FreeBuds 3 review: No more AirPods envy", Andriod Authority, May 5, 2020, retrieved from https://www.androidauthority.com/huawei-freebuds-3-review-1048427/ on Sep. 18, 2021, 18 pgs.
Porter, Jon, "Sennheiser's Momentum True Wireless 2 earbuds combine noise cancellation and excellent sound", The Verge, Mar. 13, 2020, Retrieved from: https://www.theverge.com/2020/3/13/21176874/sennheiser-true-momentum-true-wireless-2-release-date-news-features-specs-battery-life, 3 pgs.
So, Adrienne, "Review: Jaybird Vista", Wired, Jul. 31, 2019, Retrieved from: https://www.wired.com/review/jaybird-vista-earbuds/, 6 pgs.
Strietelmeier, "Creative Outlier Air True Wireless sweatproof earbuds review", the gadgeteer, May 2, 2019, retrieved from https://the-gadgeteer.com/2019/05/02/creative-outlier-air-true-wireless-sweatproof-earbuds-review/ on Feb. 17, 2021, 29 pgs.
Welch, "Apple announces AirPods Pro with noise cancellation, coming Oct. 30", The Verge, Oct. 28, 2019, retrieved from https://www.theverge.com/2019/10/28/20936454/apple-airpods-pro-new-release-date-price-noise-cancellation-design-immersive-sound on Feb. 17, 2021, 4 pgs.

* cited by examiner

EARPHONE POSITIONING AND RETENTION

RELATED APPLICATIONS

The present application is a continuation of U.S. patent application Ser. No. 17/480,008, entitled "Earphone Positioning and Retention" to Holley et al., filed Sep. 20, 2021, which claims priority to U.S. Patent Application No. 63/080,611, entitled "Earphone Positioning and Retention" to Holley et al., filed Sep. 18, 2020, the disclosures of which are hereby incorporated by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

SUMMARY OF THE INVENTION

Structures and methods for positioning and retaining an earphone in a user's ear are disclosed.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
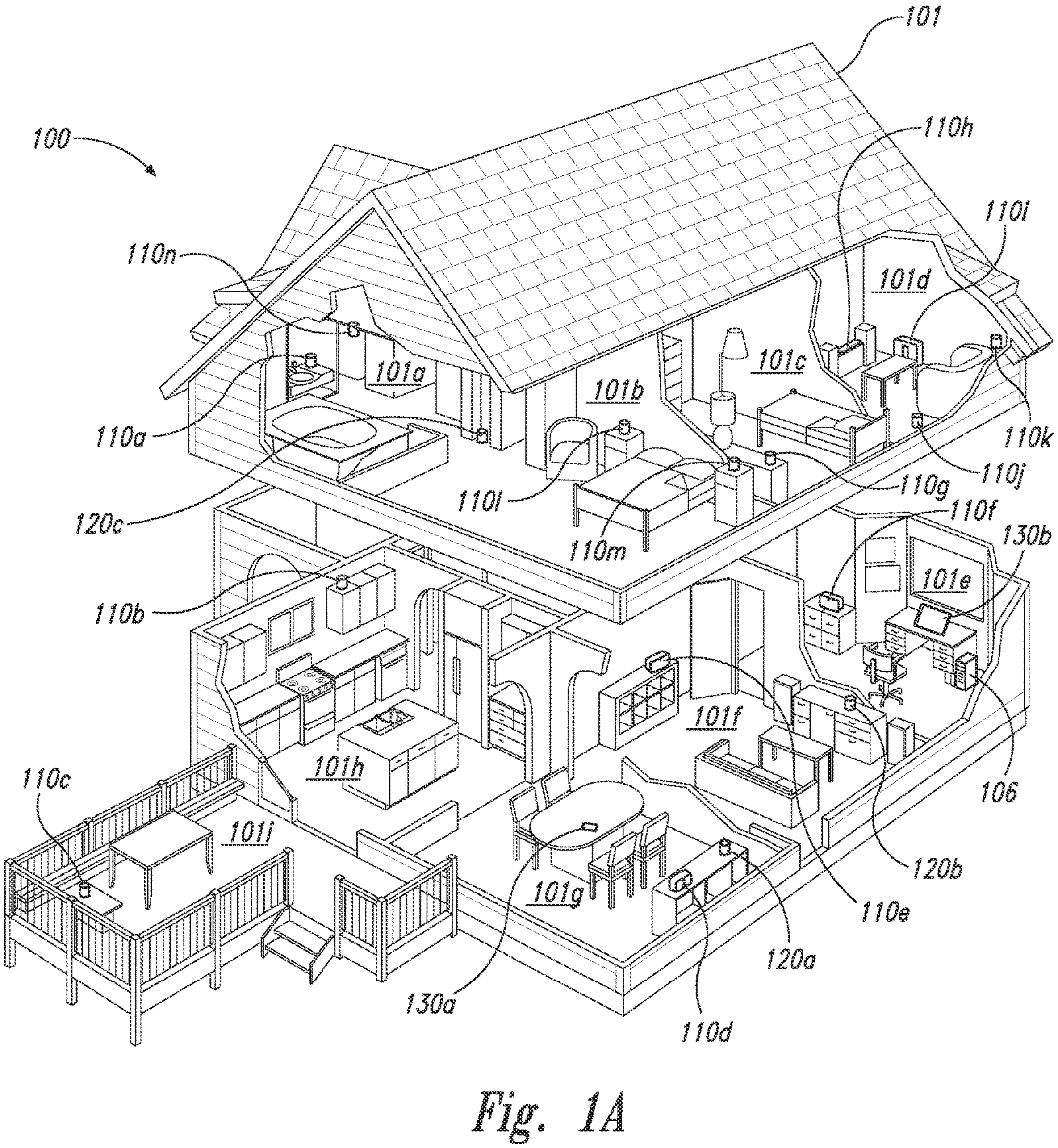
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to positioning and retaining an earphone in a user's ear. Several desirable features of an earphone in accordance with embodiments of the invention can include being lightweight, comfortable, and capable of media playback functions for convenience and usability. The features should also be balanced with adaptability of the earphone to securely fit a variety of ear shapes of different users.

Countless designs exist of in-ear audio earphones that can be used for various applications, such as music listening, teleconference, gaming, etc. Earphones can be wired (e.g., using a stereo or mini-plug jack) or wireless (e.g., connected via Bluetooth and/or other wireless protocol). Many designs of earphones rely solely on the friction and outward pressure of an eartip on a user's ear canal to secure the earphone in place. Some use a hook that wraps around an ear for retention, while others have one or more protrusions that can brace the earphone against part of a user's ear. Often these designs are suitable for certain ear shapes, but not others, and are not adaptable for different ear shapes of particular users. In addition, the ability of an earphone to stay securely in a user's ear can be affected by its weight and the distance that weight is away from the points of contact affixing it to the ear. With an increasing number of functionalities being built-in to earphones, the necessary supporting components can increase weight. In such situations, positioning and retention designs particular some earphones in accordance with embodiments of the invention may be beneficial.

An earphone with a retention member in accordance with embodiments of the invention utilizes at least two or three touchpoints to securely attach to a user's ear, including: an eartip that is circular or elliptical in its contact surface to contact the outer area of a user's ear canal, a lower point of a body portion that hooks into a bottom pocket in the ear referred to as anti-tragus, and a retention member that protrudes from the earphone and engages the cymba conch area of the user's ear. This combination of two or three contact points can create force in a direction inward and normal to the ear canal, similar to three legs of tripod. The force can be contributed through deflection of the eartip and/or prevention of the eartip from rotating. Friction in the contact surface against the surface of the ear and/or a non-circular (e.g., oval or elliptical) shape of the contact surface, which can conforming to the shape of the ear, can contribute in preventing the eartip from rotating. In several embodiments of the invention, the earphone is low profile with the housing extending only a short distance outward from the user's ear. Moving the mass inward can help with keeping the earphone in place. In additional embodiments of the invention, the retention member can be constructed of hybrid materials (e.g., two or more separate materials) and/or can be removeable from the earphone (e.g., deformable or forming a partial loop to provide separability).

Figure 1B:
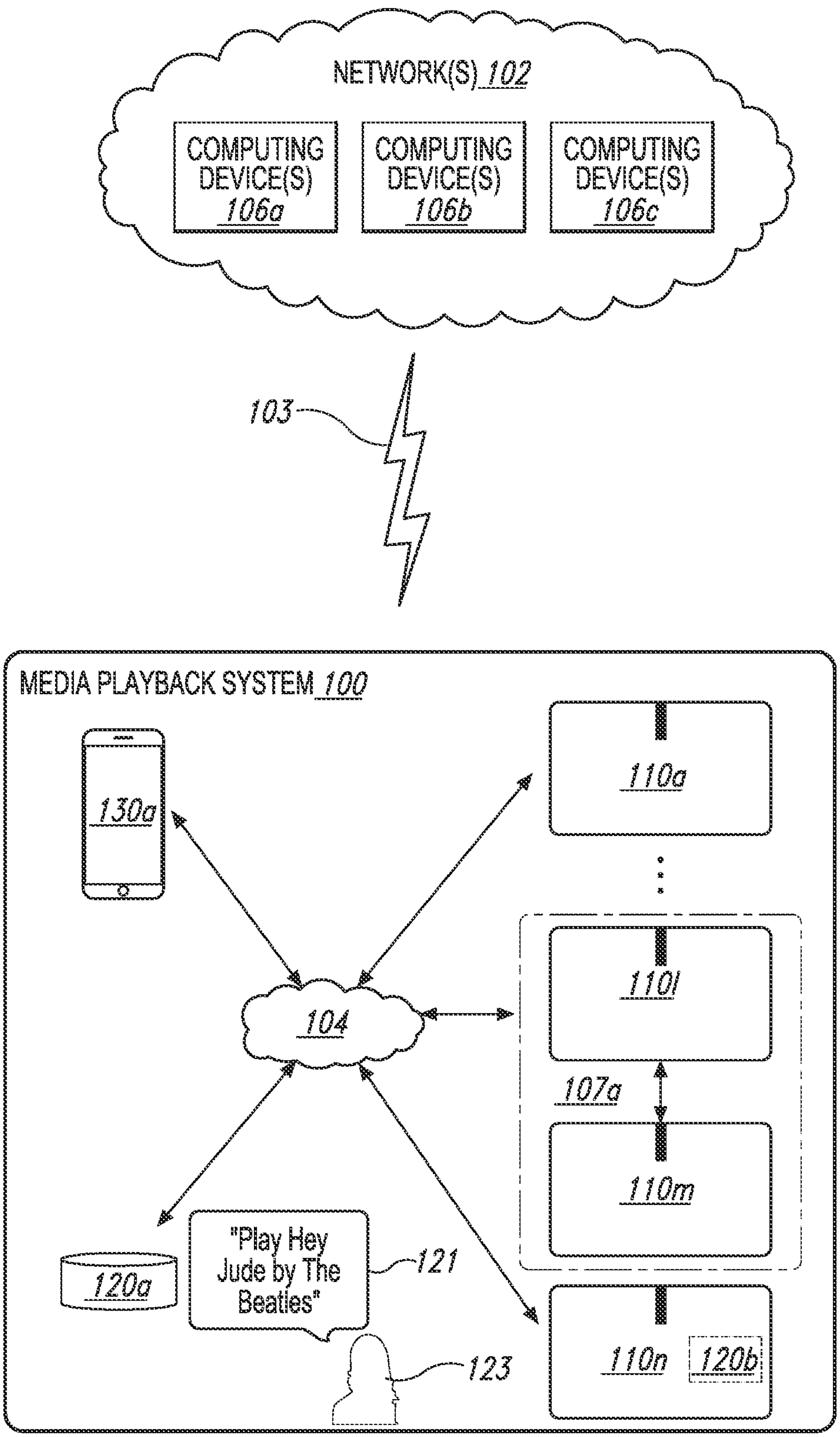
FIG. 1B is a schematic diagram of the media playback system of FIG. 1A and one or more networks.

Wireless earphones discussed herein can utilize digital communications over a wireless link (e.g., Bluetooth, WiFi, etc.) to receive audio data from any of a variety of media sources. Media may be received by a wireless earphones from a separate computing device, such as a personal computer, smartphone, or tablet or a playback device, such as a smart speaker or smart television. Media may also be received by the wireless earphones from a media streaming service, such as Spotify, iTunes, or Amazon, etc. Wireless earphones may further have onboard storage for media as well. Earphones in accordance with embodiments of the invention may have additional functions for controlling aspects of media playback, such as, but not limited to, voice control, volume, trick play (e.g., fast forward and reverse) and/or skip track. In various embodiment of the invention, an earphone or pair of earphones may be utilized in different environments for media playback, for example, in a standalone configuration (e.g., streaming or playing media from local storage), paired with a mobile phone or other mobile device, or in a networked system. In the discussion of FIGS. 1A and 1B below, earphones in accordance with embodiments of the invention can be a playback device in a media playback system as will be discussed in greater detail.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices 120 ("NMDs") (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

FIG. 1B is a schematic diagram of the media playback system 100 and at least one cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. In many embodiments, a cloud network 102 is configured to deliver media content (e.g., audio content, video content, photographs, social media content) to the media playback system 100 in response to a request transmitted from the media playback system 100 via the links 103. In some embodiments, a cloud network 102 is configured to receive data (e.g., voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

Figure 1C:
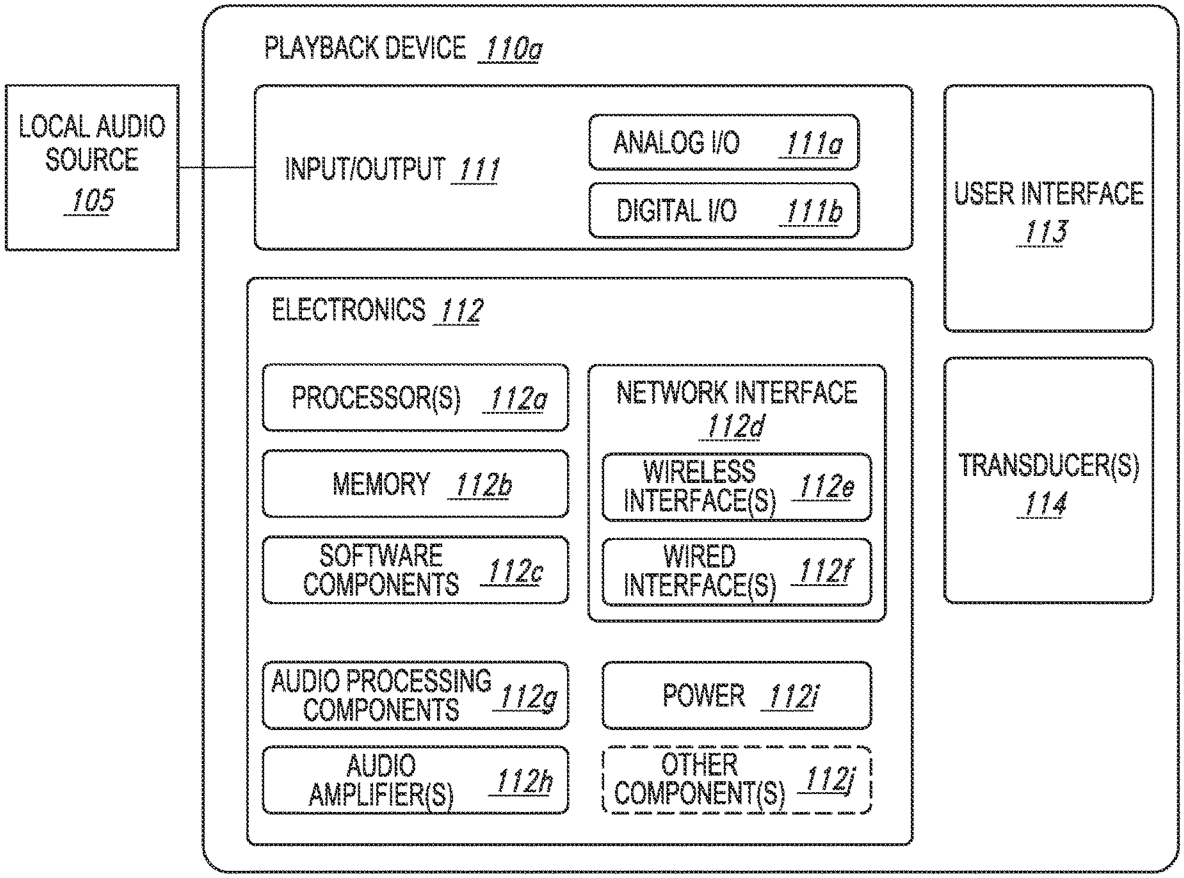
FIG. 1C is a block diagram of a playback device in accordance with certain embodiments of the invention.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
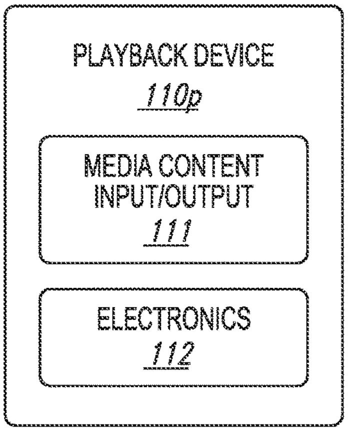
FIG. 1D is a block diagram of a playback device in accordance with certain embodiments of the invention.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
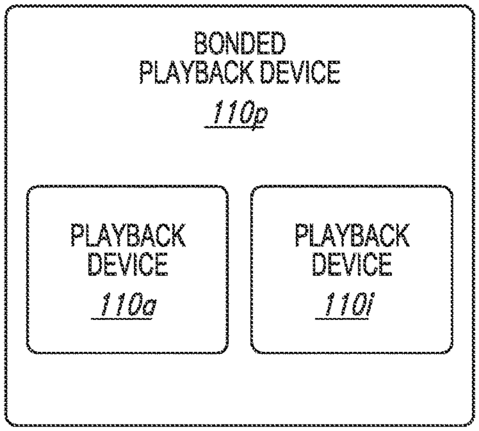
FIG. 1E is a block diagram of a network microphone device in accordance with certain embodiments of the invention.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

Figure 1F:
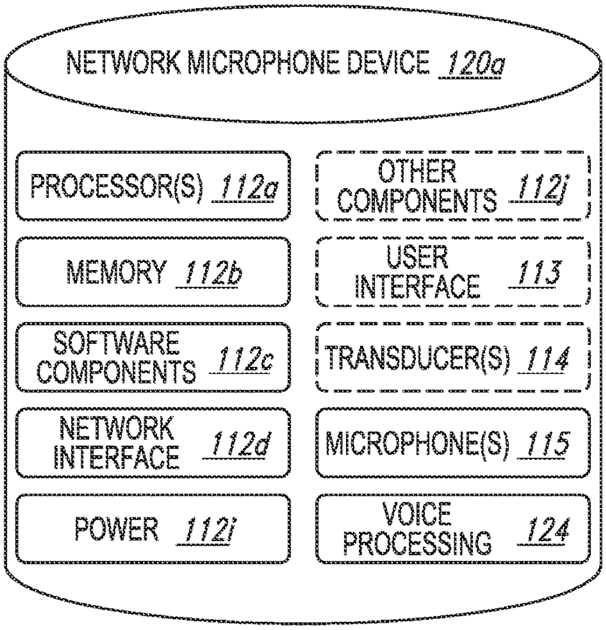
FIG. 1F is a block diagram of a network microphone device in accordance with certain embodiments of the invention.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
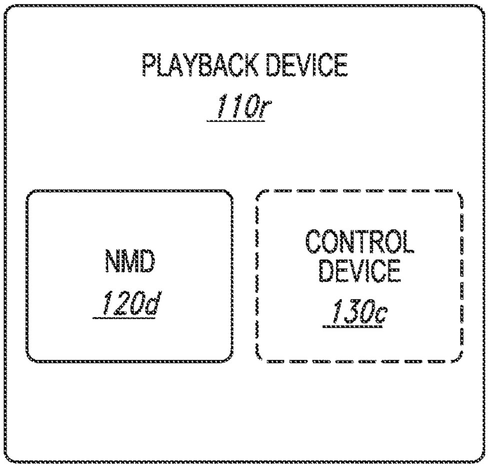
FIG. 1G is a block diagram of a playback device in accordance with certain embodiments of the invention.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
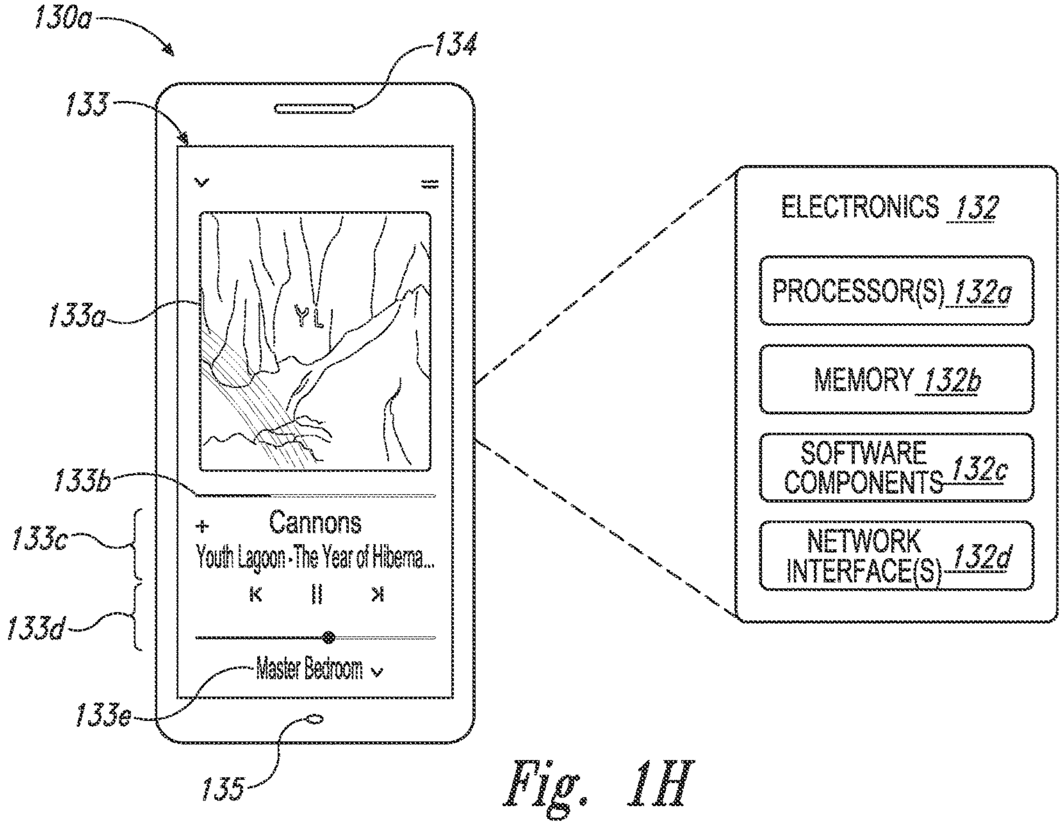
FIG. 1H is a partial schematic diagram of a control device in accordance with certain embodiments of the invention.

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of the playback devices 100. The network interface 132*d* can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Earphone Positioning and Retention

Countless designs exist of in-ear audio earphones that can be used for various applications, such as music listening, teleconference, gaming, etc. Earphones can be wired (e.g., using a stereo or mini-plug jack) or wireless (e.g., connected via Bluetooth and/or other wireless protocol). Many designs of earphones rely solely on the friction and outward pressure of an eartip on a user's ear canal to secure the earphone in place. Some use a hook that wraps around an ear for retention, while others have one or more protrusions that can brace the earphone against part of a user's ear. Often these designs are suitable for certain ear shapes, but not others, and are not adaptable for different ear shapes of particular users. In addition, the ability of an earphone to stay securely in a user's ear can be affected by its weight and the distance that weight is away from the points of contact affixing it to the ear. With an increasing number of functionalities being built-in to earphones, the necessary supporting components can increase weight. In such situations, positioning and retention designs particular some earphones in accordance with embodiments of the invention may be beneficial.

An earphone with a retention member in accordance with embodiments of the invention utilizes at least two or three touchpoints to securely attach to a user's ear, including: an eartip that is circular or elliptical in its contact surface to contact the outer area of a user's ear canal, a lower point of a body portion that hooks into a bottom pocket in the ear referred to as anti-tragus, and a retention member that protrudes from the earphone and engages the cymba conch area of the user's ear. This combination of two or three contact points can create force in a direction inward and normal to the ear canal, similar to three legs of tripod. The force can be contributed through deflection of the eartip and/or prevention of the eartip from rotating. Friction in the contact surface against the surface of the ear and/or a non-circular (e.g., oval or elliptical) shape of the contact surface, which can conforming to the shape of the ear, can contribute in preventing the eartip from rotating. In several embodiments of the invention, the earphone is low profile with the housing extending only a short distance outward from the user's ear. Moving the mass inward can help with keeping the earphone in place. In additional embodiments of the invention, the retention member can be constructed of hybrid materials (e.g., two or more separate materials) and/or can be removeable from the earphone (e.g., deformable or forming a partial loop to provide separability).

Figure 2:
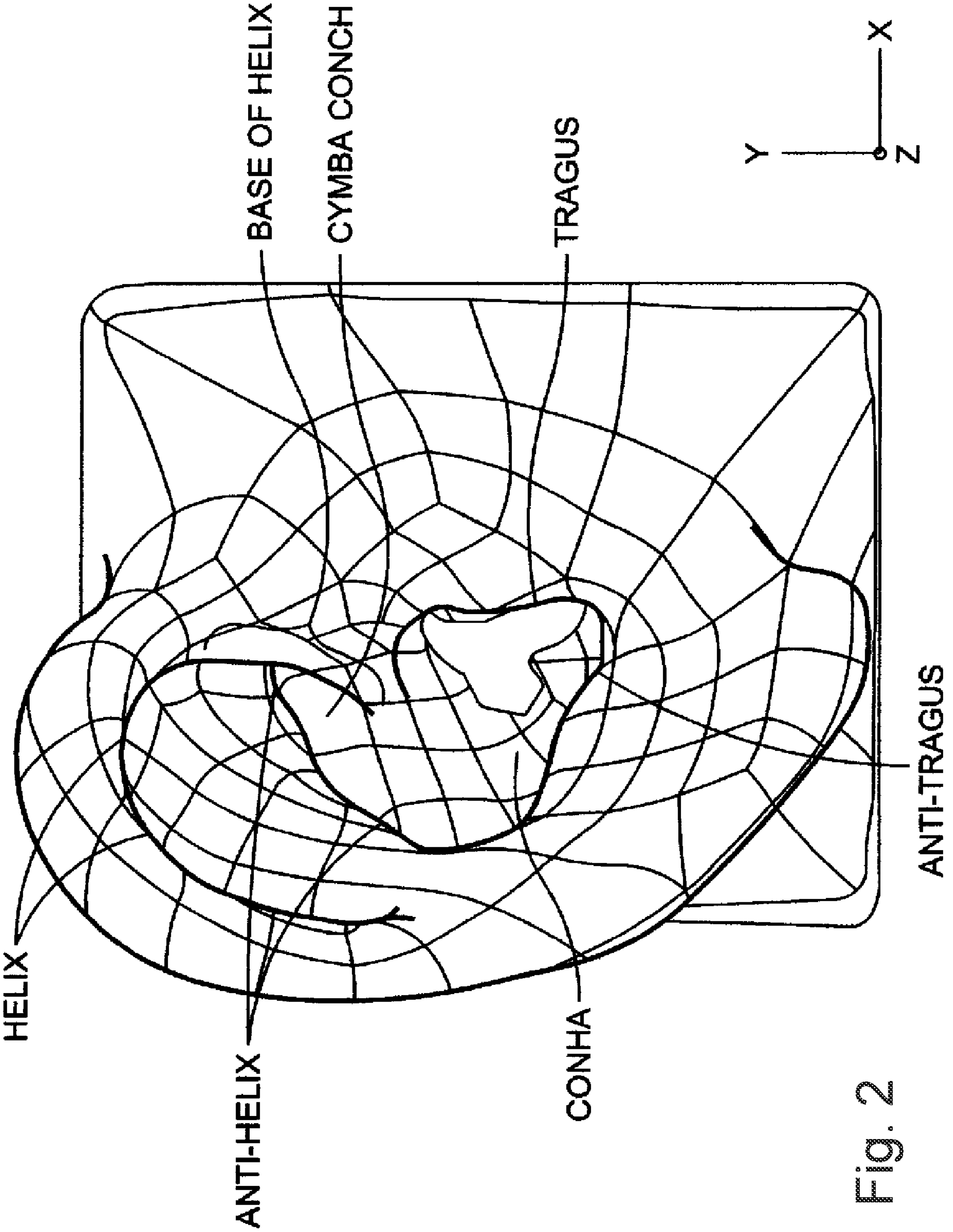
FIG. 2 is a side view of a human ear.
Figure 3:
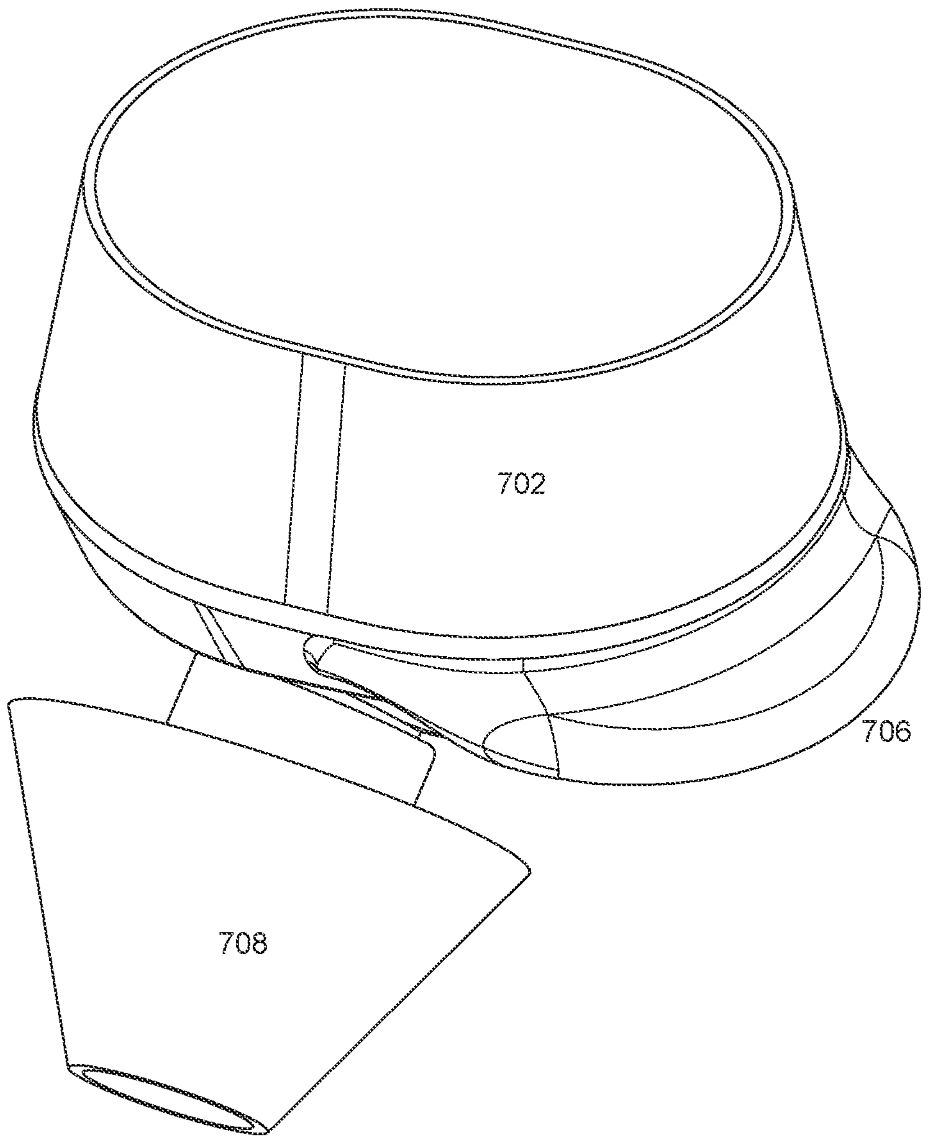
FIG. 3 illustrates a perspective view of an earphone design in accordance with certain embodiments of the invention.
Figure 4:
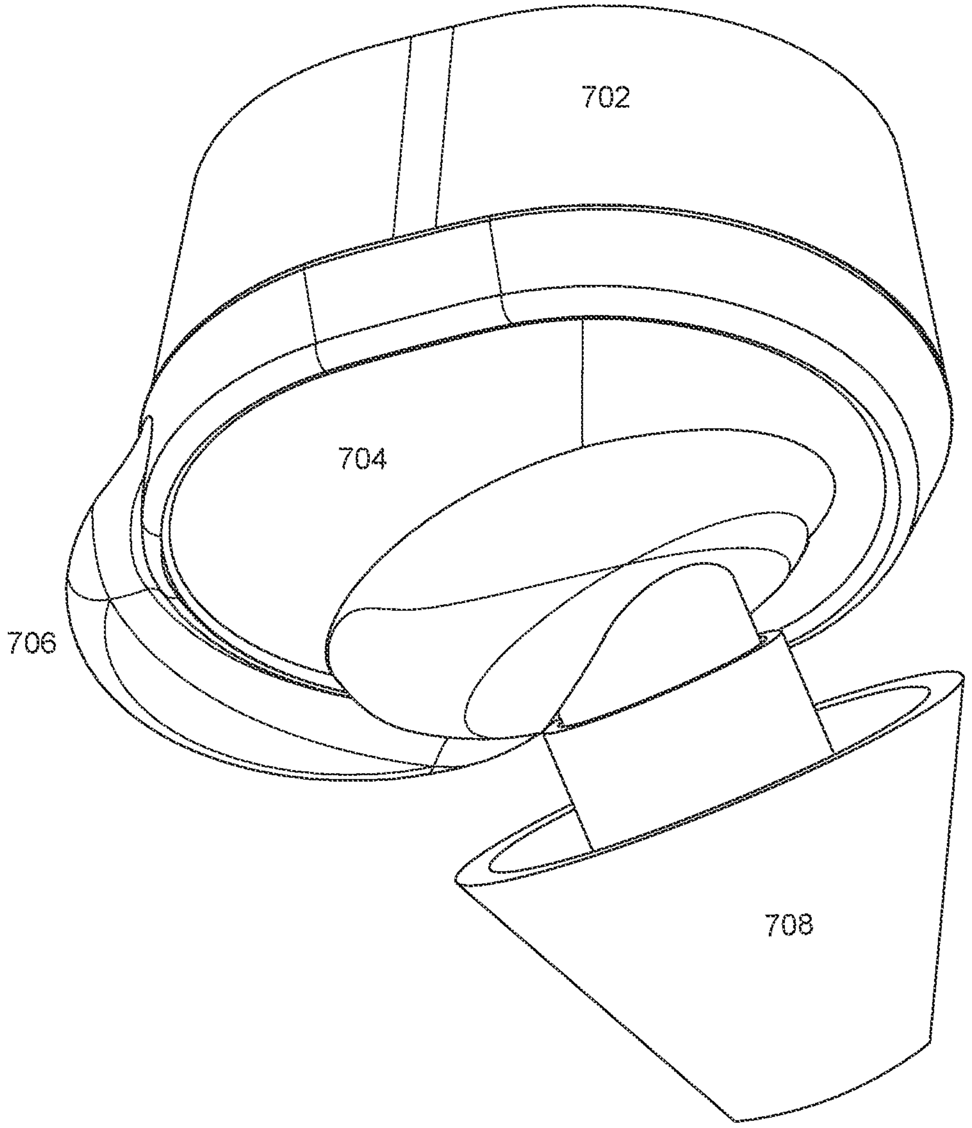
FIG. 4 illustrates a second perspective view of an earphone design in accordance with certain embodiments of the invention.
Figure 5:
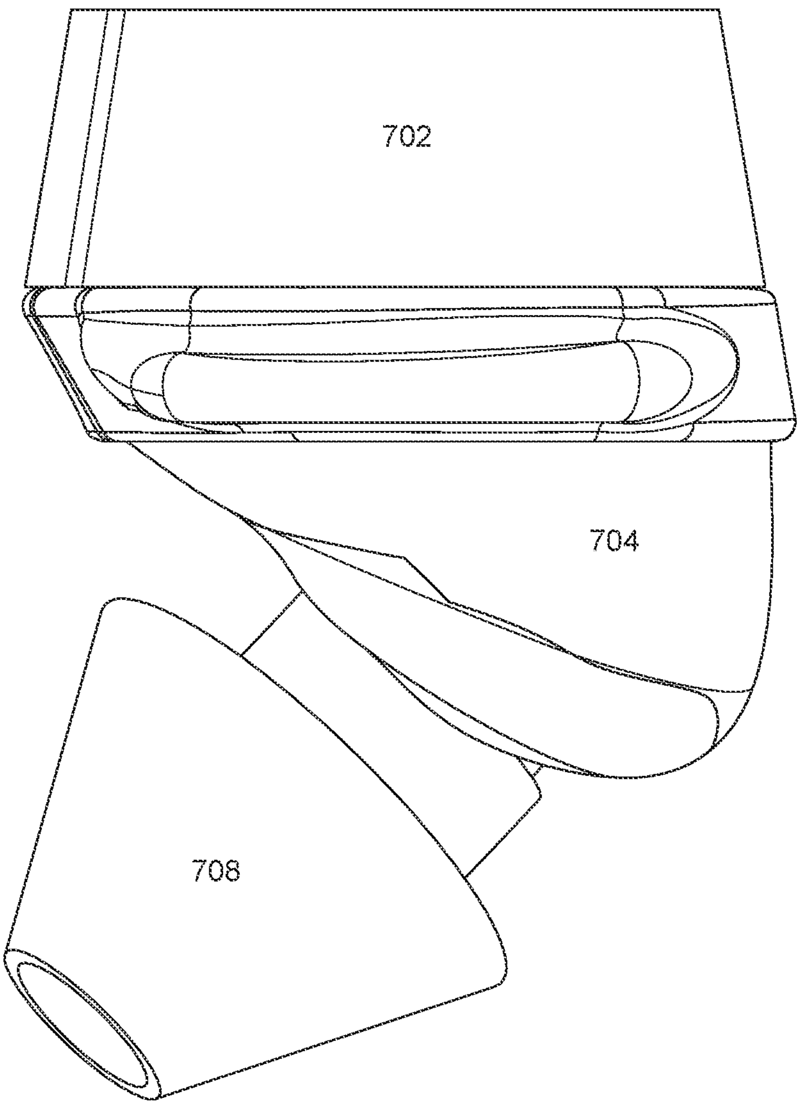
FIG. 5 illustrates a first side view of an earphone design in accordance with certain embodiments of the invention.
Figure 6:
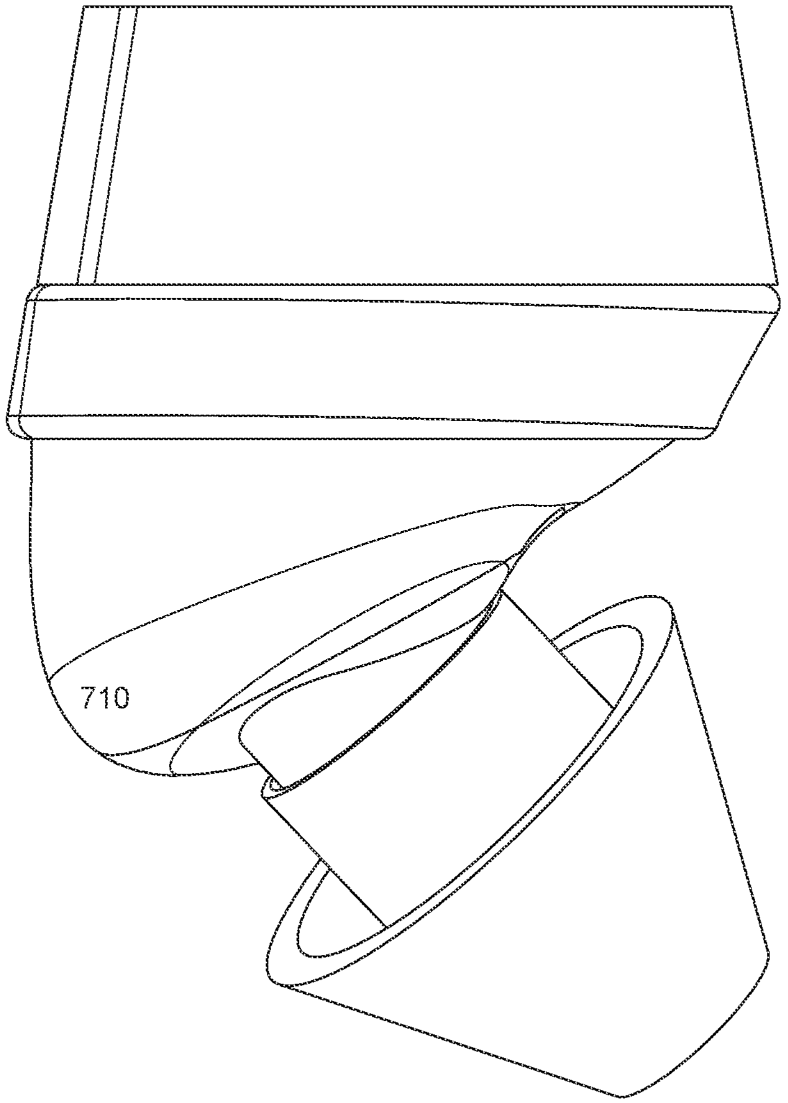
FIG. 6 illustrates a second side view of an earphone design in accordance with certain embodiments of the invention.
Figure 7:
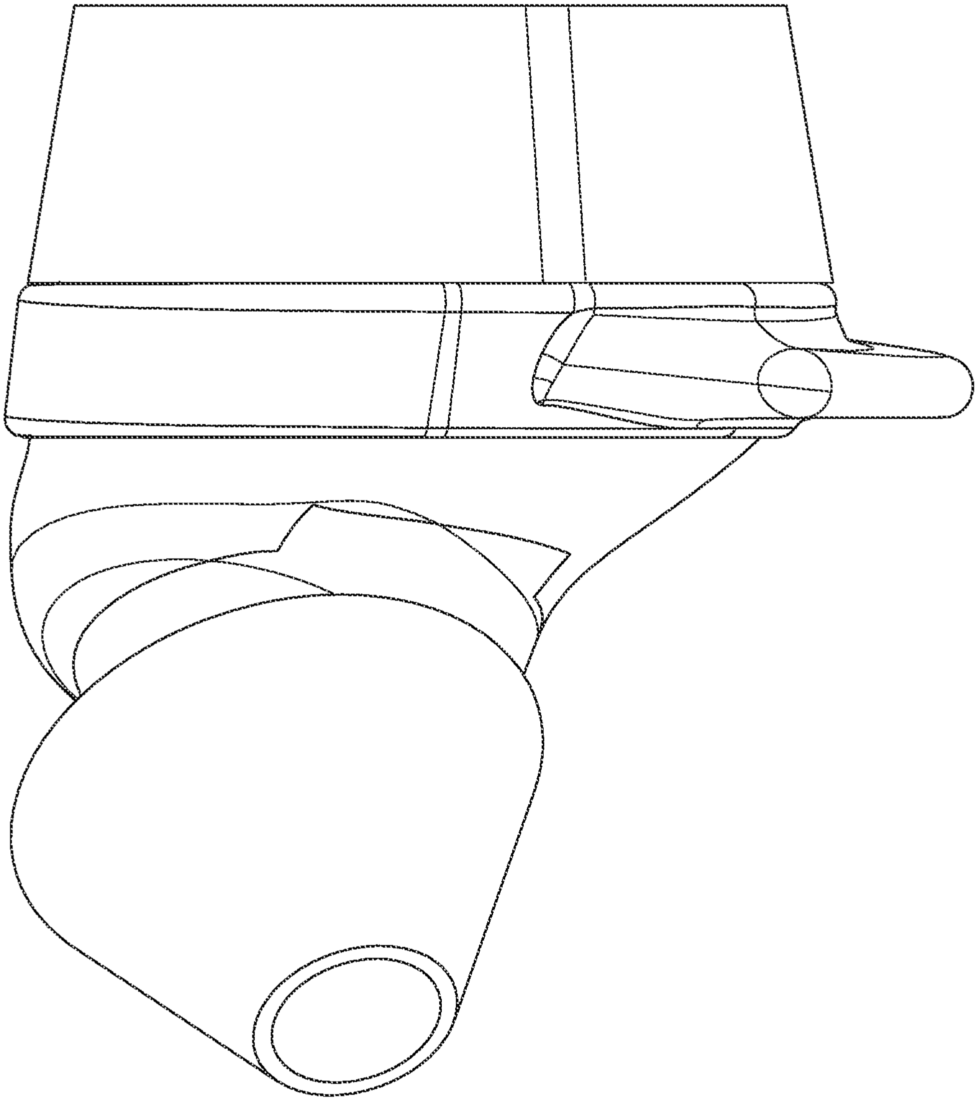
FIG. 7 illustrates a third side view of an earphone design in accordance with certain embodiments of the invention.
Figure 8:
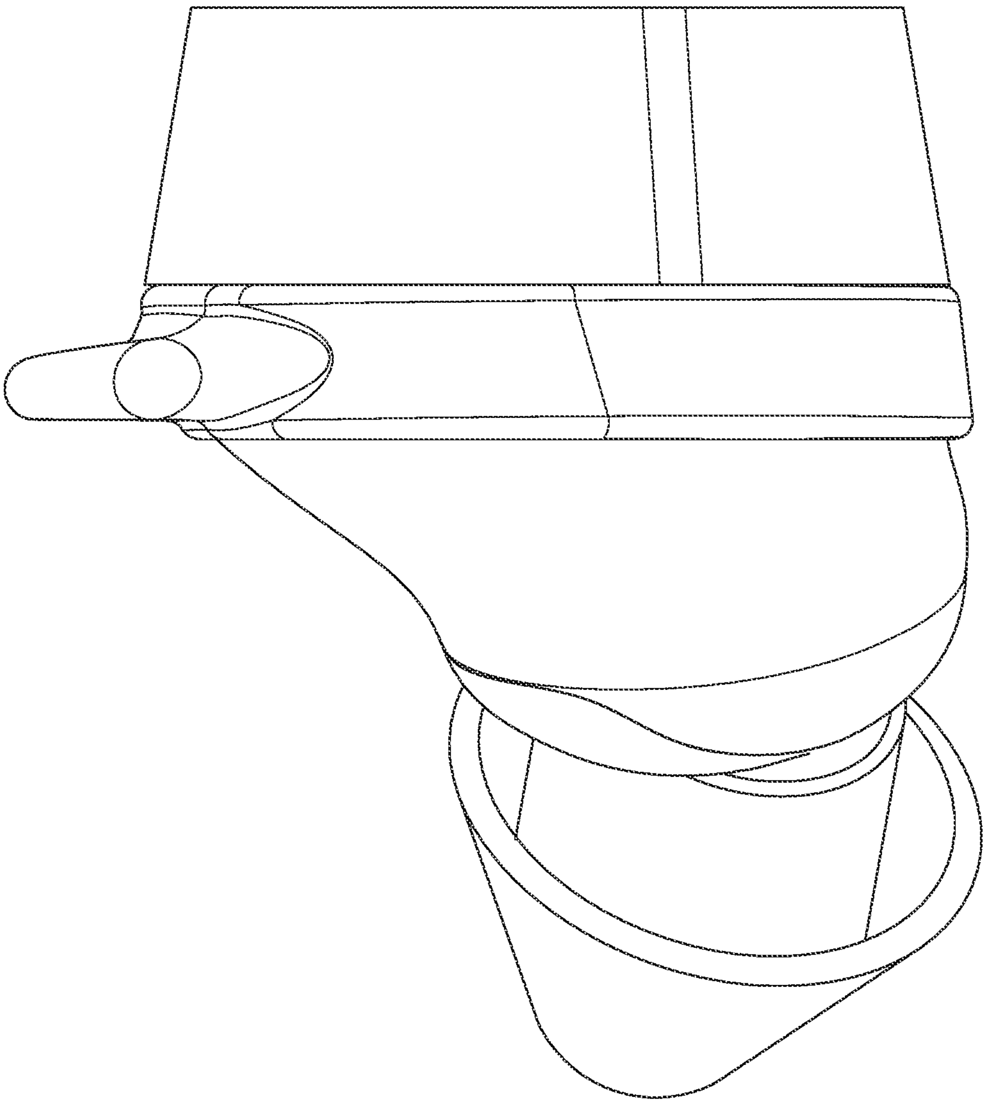
FIG. 8 illustrates a fourth side view of an earphone design in accordance with certain embodiments of the invention.
Figure 9:
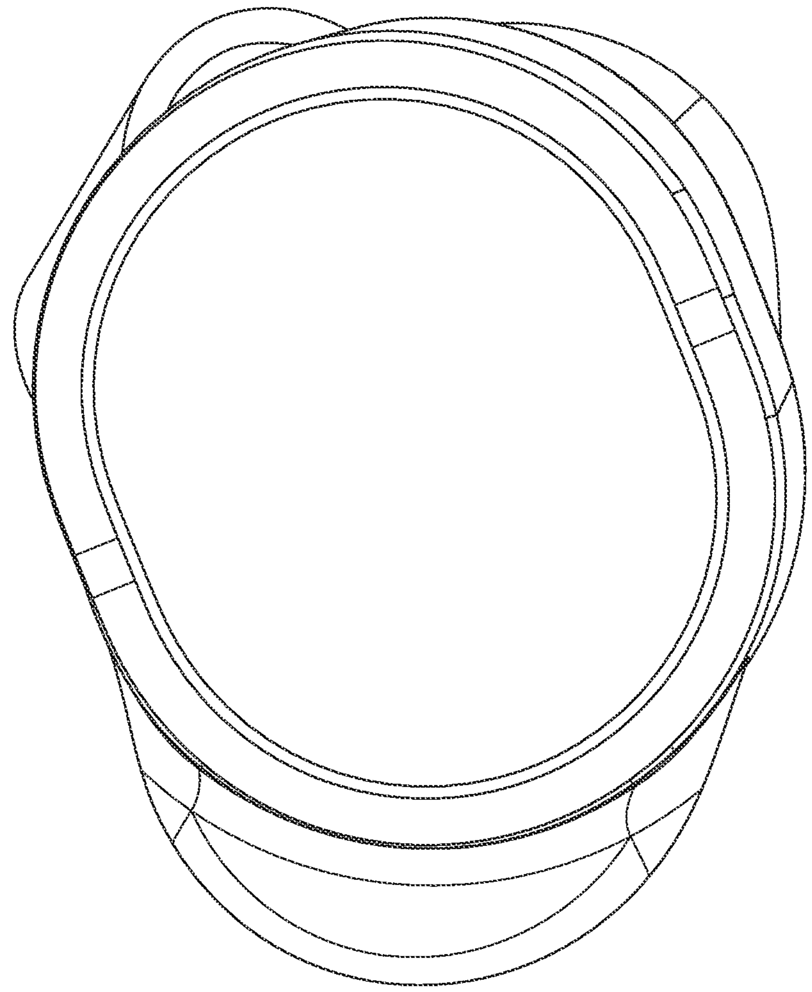
FIG. 9 illustrates a top view of an earphone design in accordance with certain embodiments of the invention.
Figure 10:
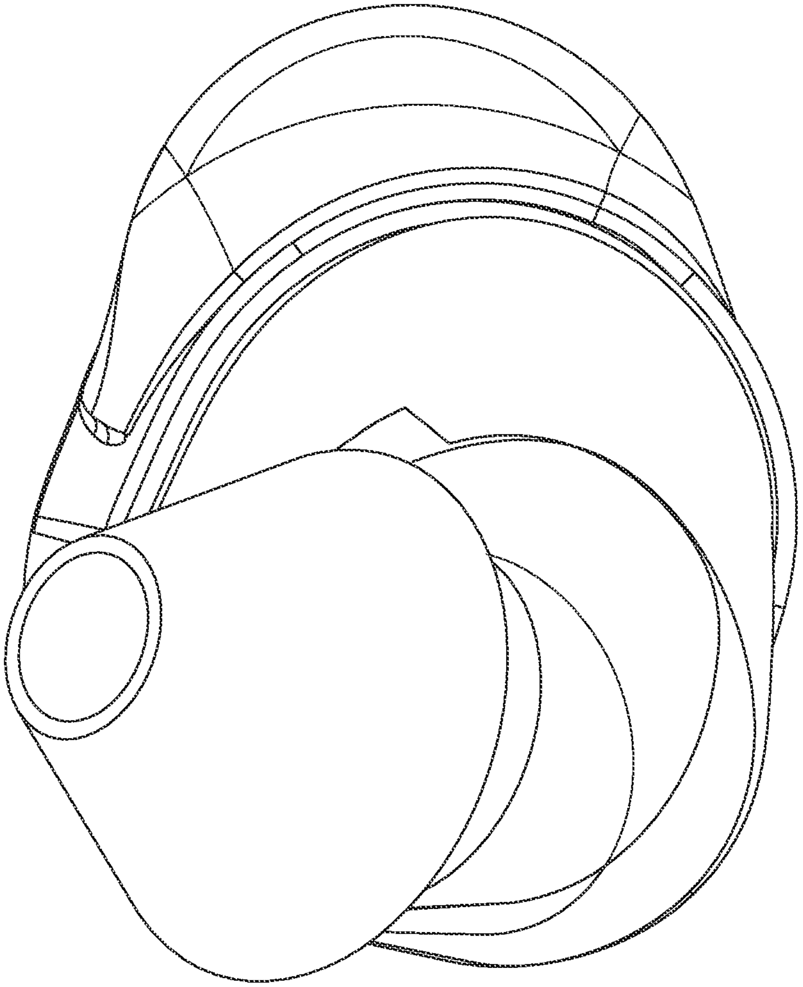
FIG. 10 illustrates a bottom view of an earphone design in accordance with certain embodiments of the invention.

FIG. 2 shows an example human ear and a Cartesian coordinate system, for the purpose of identifying terminology used in this application. "Forward" or "front" refers to the +direction along the X-axis, "backward" or "rear" refers to the −direction along the X-axis; "above" or "up" refers to the +direction along the Y-axis, "below" or "down" refers to the −direction along the Y-axis; "on top of" and "outward" refers to the +direction along the Z-axis (out of the page), and "behind" or "under" or "inward" will refer to the −direction along the Z-axis (into the page).

The description that follows will be for an earphone that fits in the right ear. For an earphone that fits in the left ear, some of the definitions, or the "+" and "—" directions may be reversed, and "clockwise" and "counterclockwise" may mean rotation in different directions relative to the ear or other elements than is meant in the description below. There are many different ear sizes and geometries. Some ears have additional features that are not shown in FIG. 2. Some ears lack some of the features that are shown in FIG. 2. Some features may be more or less prominent than are shown in FIG. 2.

In many embodiments of the invention, an earphone can include an electronics module for wirelessly receiving incoming audio signals from an external source. The electronics module may also include a microphone for transducing sound into outgoing audio signals. The electronics module can further include circuitry for wirelessly transmitting the outgoing audio signals. The electronics module may be enclosed within an upper housing portion of the earphone. The earphone can further include an audio module that includes an acoustic driver for transducing the received audio signals to acoustic energy. The earphone can further include a body portion. The body portion can include an in-ear portion. The in-ear portion can include an outlet section dimensioned and shaped to fit inside a user's ear canal entrance and a passageway for conducting the acoustic energy from the audio module to an opening in the outlet section. The earphone can also include a positioning and retaining structure that is connected to and protrudes from the body portion or the upper housing. Next, more structural details for an earphone according to various embodiments of the invention are discussed.

IV. Structures for an Earphone with Retaining Member

Referring to FIGS. 8-15, the structure of an earphone in accordance with certain embodiments of the invention are described. In many embodiments of the invention, an earphone includes an acoustic driver, upper housing 702, a body portion 704, a retaining member 706, and an eartip 708.

The upper housing 702 may contain electronic circuitry (not pictured), such as, but not limited to, circuitry for wireless receiving and/or transmitting audio signals, decoding a wireless audio signal into an analog audio signal, and/or amplifying an analog audio signal for reproduction by an acoustic driver.

The eartip 708 can be any of a variety of shapes that are appropriate for fitting into a user's ear. For example, the eartip can be a cone shape with a circular or elliptical cross-sectional shape, forming a circular or elliptical contact surface to contact a user's ear canal. In many embodiments of the invention, at least the contact surface at the tip of the eartip is made of a compliant material that has slightly adhesive or tacky property. As will be described further below, the friction of this surface in contact with a user's ear canal can act as a retention mechanism to keep the earphone in place, particularly in combination with two additional features of the earphone described below.

The body portion 704 may contain an acoustic driver and/or other components for producing sound through the eartip. In several embodiments, the body portion 704 and upper housing 702 may be combined to form an internal space that can be referred to as an interior chamber. The interior chamber can be further divided into one or more subchambers. Various internal components such as those described further above with respect to circuitry of earphones and other media playback devices (e.g., processor, wireless network adapter, amplifier, etc.) may be arranged in a variety of configurations within the interior chamber or one or more subchambers. Furthermore, one or more subchambers may form acoustic cavity or port as pathways for acoustic waves or acoustic pressure from one or more drivers in the earphone. In many embodiments of the invention, a bottom point of the body portion forms a contact surface to contact the anti-tragus area of a user's ear as one of the three primary contact surfaces mentioned further above.

The retaining member 706 may be connected to the upper housing, the body portion, or both, as appropriate to the design of the particular earphone in a number of embodiments. In some embodiments of the invention, the retaining member 706 is made of at least two materials, where one portion of the retaining member is formed of a pliable or compliant material (such as soft elastomer or rubber) and another portion is formed of a rigid or non-compliant material (such as hard plastic). The rigid section may allow the retaining member to substantially maintain its shape and/or to engage to main body of the earphone. The rigid material may also help in keeping retaining member 706 in a specific orientation relative to the rest of the earphone. The compliant section(s) of the retaining member 706 can form a gap or other deformable portion to allow the retaining member 706 to be moveable and/or removed from the earphone. In some embodiments, the non-compliant material forms a ring shape, or a ring shape with a gap, that encircles the body portion 104 or upper housing 102, or the seam where the body portion 104 and upper housing 102 join. The compliant material may be disposed to the interior of the ring, allowing installation and removal of the retaining member 706 as the compliant material is deformed. In similar embodiments, the compliant material fills the gap completing the ring shape where the non-compliant material is absent.

The same or a different compliant section can also form a contact surface to contact a user's ear as discussed further above. A compliant material is typically more comfortable in use. In many embodiments, the contact surface of the retaining member 706 is formed to contact the cymba conch area of a user's ear. In further embodiments, the contact surface is an arc or semi-circular shape. At least a portion of the compliant section may form the contact surface.

While a specific structure to an earphone is discussed above with respect to FIGS. 3-10, one skilled in the art will recognize that any of a variety of structures may be utilized in accordance with embodiments of the invention as appropriate to any particular application. Processes for affixing an earphone to a user's ear are discussed below.

V. Processes for Wearing an Earphone with Retaining Member

Figure 11:
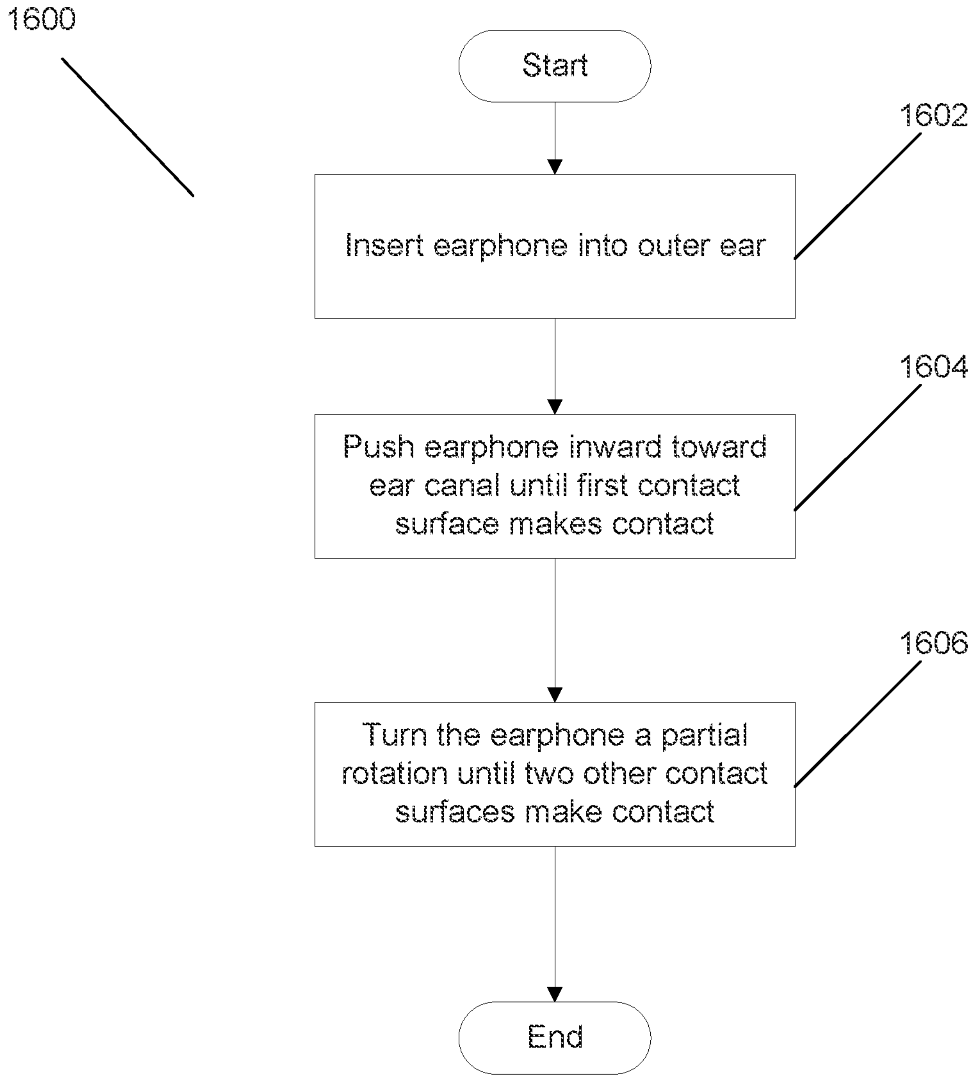
FIG. 11 is a flow chart illustrating a process for affixing an earphone to a user's ear in accordance with certain embodiments of the invention.

A process for placing an earphone into a wearing position on a user is illustrated in FIG. 11. In several embodiments, the earphone has components such as those described further above with respect to FIGS. 3-10. Components of the earphone can include an eartip, a body portion, an upper housing, and a retaining member such as described above. In further embodiments, the wireless headphone is a playback device that is also a network microphone device (NMD), equipped with a microphone, such as those described above with respect to FIG. 1F. The earphone may be utilized in a media playback system such as those illustrated in FIGS. 1A and 1B. In various embodiments, the earphone is wireless and may be connected (via Bluetooth or other wireless communications link) to a mobile device or other computing system. A user or another person helping the user may perform the process below to secure the earphone in a wearing position on the user.

The process includes inserting (1602) the earphone into the outer cavity portion of a user's ear. The process proceeds to pushing (1604) the earphone inward toward the user's ear canal until the elliptical-shaped first contact surface of the eartip contacts the user's ear canal. In several embodiments, friction between the eartip contact surface and the ear canal acts as one of at least three features that help to retain the position of the earphone in the user's ear when it is in its final placement.

The process next proceeds to turning (1606) the earphone a partial rotation about an axis in the direction of the ear canal until the second contact surface of the body portion of the earphone contacts the anti-tragus area of the user's ear and the third contact surface of the retaining member contacts the cymba conch area of the user's ear. Referring again to FIG. 2, generally the anti-tragus area is at the upper portion of the earlobe and the cymba conch area is at the lower portion of the earlobe. The bracing of the second and third contact surfaces against portions of the earlobe in combination with the frictional fit of the contact surface of the eartip in the earl canal can act to prevent rotational and outward movement of the earphone away from the ear.

Although a specific process is described above with respect to FIG. 11, one skilled in the art will recognize that any of a variety of processes may be utilized in accordance with embodiments of the invention as appropriate to a particular application.

VI. Conclusion

Additional structures and processes are described in U.S. Patent Publication No. 2015/0092977 entitled "Earpiece Positioning and Retaining" to Silvestri et al., the relevant portions of which are incorporated by reference in their entirety. The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method for placing an earphone into a wearing position on a user, the method comprising:

inserting an earphone into the outer cavity portion of a user's ear, where the earphone comprises an eartip, a body portion, and a retaining member;

where the eartip comprises an oval-shaped first contact surface at an opening forming a hole through the eartip;

where the body portion comprises a second contact surface formed to conform to an anti-tragus portion of a user's ear;

where the retaining member comprises a third contact surface formed to conform to a cymba conch portion of a user's ear;

wherein the retaining member comprises a loop configured to fit around the body portion;

pressing the earphone inward toward the user's ear canal until the oval-shaped first contact surface of the eartip contacts the ear canal; and turning the earphone a partial rotation about an axis that is aligned in the direction of the ear canal until the second contact surface of the body portion contacts the anti-tragus portion of the user's ear and the third contact surface of the retaining member contacts the cymba conch portion of the user's ear.

2. The method of claim 1, wherein the earphone further comprises an acoustic driver within the body portion and the method further comprises applying an audio signal to the acoustic driver to produce acoustic sound through the eartip.

3. The method of claim 2, wherein the earphone further includes a wireless communication module configured to wirelessly receive the audio signal and the method further comprises wirelessly receiving and decoding the audio signal at the wireless communication module.

4. The method of claim 1, wherein the third contact surface of the retaining member comprises an arc shaped curve whose two ends contact the body portion.

5. The method of claim 1, wherein the retaining member is removeable from the earphone.

6. The method of claim 5, wherein the method further comprises removing the retaining member and fitting a replacement retaining member over the body portion.

7. The method of claim 6, wherein the loop of the retaining member comprises a compliant material at least partially surrounding a non-compliant material, such that when fitting the retaining member over the body portion the non-compliant material does not bend and the compliant material bends slightly.

8. An earphone comprising:

a speaker driver;

a flexible eartip comprising a first oval shaped contact surface at an opening forming a hole through the eartip, the first oval shaped contact surface configured to contact an outer surface of a user's ear canal when worn;

a body portion comprising a second contact surface configured to position behind an anti-tragus portion of the user's ear when worn; and a retaining member comprising a loop configured to fit around the body portion and formed of a compliant material, the retaining member further comprising a third contact surface configured to conform to a cymba conch portion of the user's ear when worn;

wherein the body portion and the retaining member are shaped in a way that the second contact surface contacts the anti-tragus portion and the third contact surface contacts the cymba conch portion substantially at the same time, when the first contact surface is already in contact with the outer surface of the user's ear canal and the earphone is turned a partial rotation about an axis that is aligned in the direction of the ear canal.

9. The earphone of claim 8, wherein the earphone further comprises an acoustic driver within the body portion and the earphone is configured to apply an audio signal to the acoustic driver to produce acoustic sound through the eartip.

10. The earphone of claim 9, further comprising a wireless communication module configured to receive and decode the audio signal.

11. The earphone of claim 9, further comprising a physical control configured to start playback of the audio signal when it is actuated.

12. The earphone of claim 8, wherein the third contact surface of the retaining member comprises an arc shaped curve whose two ends contact the body portion.

13. The earphone of claim 8, wherein the retaining member is removeable from the earphone.

14. The earphone of claim 8, wherein the loop of the retaining member comprises a compliant material at least partially surrounding a non-compliant material, such that when fitting the retaining member over the body portion the non-compliant material does not bend and the compliant material bends slightly.

* * * * *